US005181309A

United States Patent [19]

Radtke

[11] Patent Number: 5,181,309

[45] Date of Patent: Jan. 26, 1993

[54] STAPLING UNIT HAVING AN AUXILIARY DEVICE FOR ATTACHING AN ANVIL

[75] Inventor: Manfred Radtke, Korb, Fed. Rep. of Germany

[73] Assignee: Eastman Kodak Company, Rochester, N.Y.

[21] Appl. No.: 796,967

[22] Filed: Nov. 25, 1991

[30] Foreign Application Priority Data

Mar. 8, 1991 [DE] Fed. Rep. of Germany ... 9102798[U]

[51] Int. Cl.[5] ........................ B23Q 3/18; B25C 7/00

[52] U.S. Cl. ........................ 29/465; 29/283; 29/464; 29/525.1; 33/645; 227/155; 227/156

[58] Field of Search .................. 227/155, 156; 29/271, 29/283, 464, 465, 525.1; 33/645, 655

[56] References Cited

U.S. PATENT DOCUMENTS 2,227,826 1/1941 Drypolcher et al. ........... 227/155 X 4,555,840 12/1985 Nakamura ........................ 29/271 x 4,717,063 1/1988 Ebihara ........................ 227/156 X

*Primary Examiner*—Frank T. Yost

*Assistant Examiner*—Clark F. Dexter

*Attorney, Agent, or Firm*—Tallam I. Nguti

[57] ABSTRACT

A stapling unit includes an auxiliary device for attaching an anvil thereof adjustably relative to a stapler head of the stapling unit. The auxiliary device includes a rib-type projection for inserting into the stapler head of the unit, and a positioning pin for mounting to the anvil.

6 Claims, 2 Drawing Sheets

STAPLING UNIT HAVING AN AUXILIARY DEVICE FOR ATTACHING AN ANVIL

BACKGROUND OF THE INVENTION

1. Field of the Invention

The invention relates to an auxiliary device for attaching an anvil to an anvil base of a sheet-stapling unit.

In order to attach the anvil of a stapling unit in a position which is exactly defined with respect to the stapling gap of the stapling head of such unit, the auxiliary device according to the present invention is designed as an adjustment piece with fitting means which allow one of the sides of the piece to be positively connected with the stapling head and its other side to be connected with the anvil.

2. Description Relative to the Prior Art

Various types of sheet-stapling units each including an anvil are known. Thanks to the present invention, the anvil of each such unit can now be mounted on its associated anvil base in an exactly defined position in which the stapling gap of the stapling head of the unit situated in its operative position is accurately aligned with the arcuate working surfaces of the anvil and, as a result, the legs of each staple ejected from the stapling gap and driven through sheets being stapled are correctly clinched to form a desired stapling connection. In the absence of the auxiliary device according to the invention, considerable care and time are ordinarily required for connecting the anvil with its anvil base.

Normally, connecting the anvil of the stapling unit with its base is particularly complicated and time-consuming if stapling units with more than one stapling head are used, for example stapling units having a stationary and an adjustable stapling head which is shiftable relative to said stationary stapling head and adjustable to different sheet sizes or formats. In the case of such stapling units which may be designed, e.g. as so-called saddle stitchers, not only the anvil for the stationary stapling head but also a plurality of further anvils are attached to the anvil base which extends in the direction of the adjustment movement of the adjustable stapling head, and the positions of said further anvils must each be aligned with respect to the different stapling positions which the adjustable stapling head can assume for the stapling of sheets of different sizes or formats.

SUMMARY OF THE INVENTION

In using the auxiliary device according to the present invention, the anvil and anvil base can be connected in a particularly simple and easy manner, and with desired precision.

The auxiliary device according to the present invention offers a very simple method of attaching all types of anvils with the anvil base of a stapling unit. The method of the present invention consists of first pre-assembling the anvil with the anvil base and then attaching the adjustment piece to the stapling head. Since the adjustment piece is positively fixed in its position relative to the stapling gap of the stapling head it forms an adjustment gauge by means of which the anvil is precisely aligned relative to the stapling gap when the stapling head is moved to its operative position close to the anvil and the fitting means are thus brought into positive engagement. The anvil can now be finally attached before the stapling head along with the adjustment piece is returned to the position in which it is retracted from the anvil whereupon the adjustment piece is removed from the anvil.

The auxiliary device according to the present invention allows a plurality of anvils to be mounted on the anvil base speedily and in exact alignment if a stapling head is used which is slidable for adjustment to different sheet sizes or formats. In such a case, the afore-described method is carried out after the stapling head has been set to one of its stapling positions.

The anvil can be pre-assembled with the anvil base for example in that a screw connection provided for mounting the anvil on the base is first slightly screwed together and tightened only after the fitting means of the adjustment piece and the anvil have been brought into engagement. The auxiliary device is, of course, also applicable in the case of other types of fastening of the anvil such as riveting, in which case the elements are riveted loosely at the beginning and firmly riveted together after alignment by means of the adjustment piece. In the case of spot welding the anvil might be preliminarily attached by means of flexible clamps which would be removed after the anvil aligned by means of the adjustment piece had been spot-welded to its base.

According to a preferred embodiment the fitting means provided for positive engagement with the stapling head can be at least one rib-shaped projection adapted to fit into the stapling gap of the stapling head.

Preferably, the fitting means provided for positive attachment with the anvil consist of positioning bolts on the auxiliary device and positioning bores in the anvil which can be brought into engagement with each other.

For use of the auxiliary device, the present invention also relates to a suitable sheet-stapling unit with a stapling head that is movable between an operative position in which its stapling gap provided for ejecting a staple is close to an anvil, and a retracted position more remote from said anvil and with an anvil base on which the anvil can be mounted, by means of the auxiliary device according to the invention, in a position in which it is aligned with respect to the operative position of the stapling gap of the stapling head. According to the invention, the anvil and the stapling head have fitting means which can be brought into positive engagement with the auxiliary device. Preferably, the stapling gap of the stapling head serves as a fitting means which is brought into positive engagement with a corresponding configured projection of the auxiliary device.

BRIEF DESCRIPTION OF THE DRAWINGS

In the following the present invention will be described in detail with reference to the drawings in which.

DETAILED DESCRIPTION OF THE PREFERRED EMBODIMENT

Figure 1:
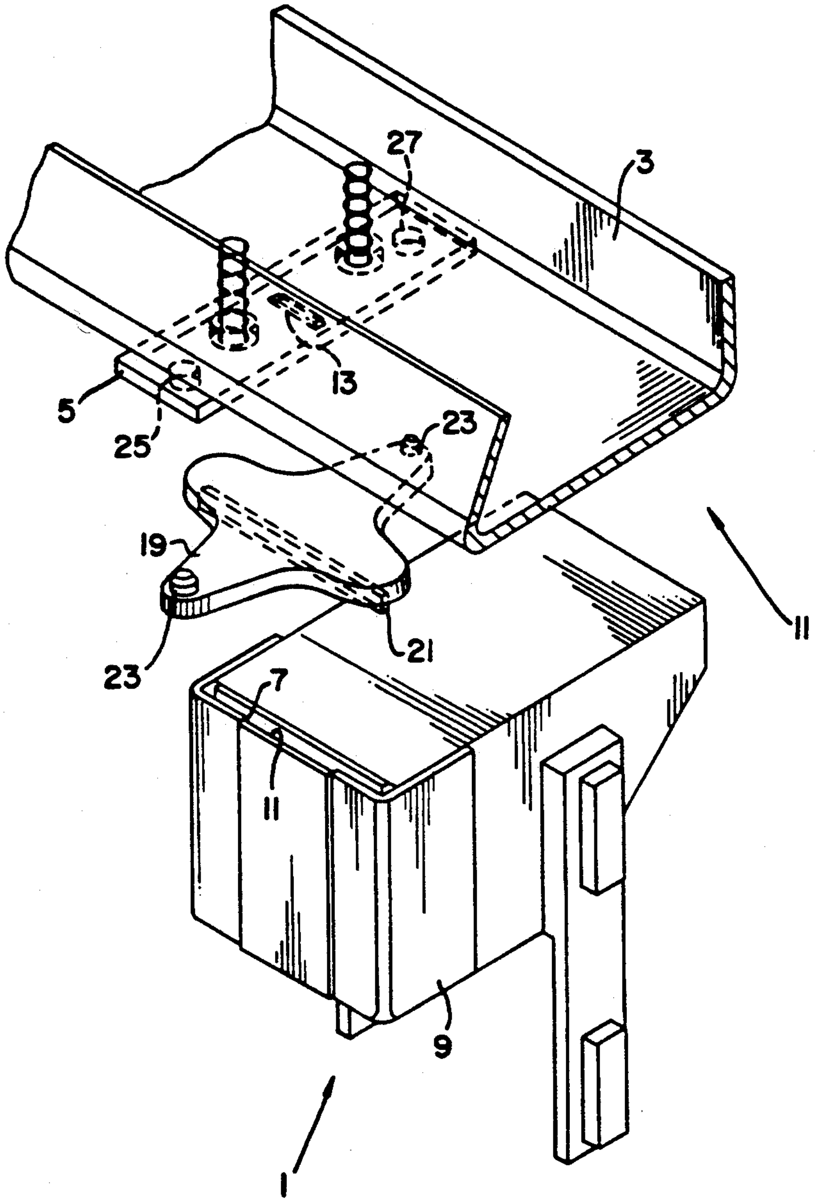
FIG. 1 shows a perspective and exploded view of an embodiment of the auxiliary device, which is designed as an adjustment piece, and of a stapling unit provided for the application of said auxiliary device, with only such parts of the stapling unit being illustrated as are indispensable to its cooperation with said adjustment piece.

The following description relates to an example of the present invention where the stapling unit takes the form of a well-known saddle stitcher, i.e. an apparatus in which two stapling heads provided in a stapling station apply two staples from below along a central line of the sheet stack and at a distance from the sheet edges. When the sheet stack has been stapled it is moved out of the stapling station and folded about said central line which includes the staples to form a booklet which is moved downwards through a nip between withdrawal rollers. Accordingly, the stapling heads are located below the sheet stack to be stapled while the anvils cooperating with said heads are arranged above said sheet stack.

Of a stapling device of this type, the drawing only shows one stapling head, generally denoted 1, of a stapling station including two stapling heads of which one is located in a fixed position relative to the edges of the sheets to be stapled and the other is adjustable so that different sizes or formats of sheets can be handled. Analogously the drawing only shows a partial longitudinal view of an anvil base 3 which is designed as a C-shaped profiled bar and to the lower surface of which a single anvil 5 is secured which is adapted for cooperation with stapling head 1.

The anvil base 3 extends horizontally and in the adjustment direction of the stapling head, whose position can be adjusted to suit different sheet sizes or formats, and comprises, in addition to the anvil 5 illustrated, a number of further anvils which are each aligned to a corresponding stapling position in which they cooperate with a stapling head during a stapling operation.

Stapling head 1 has a stapling gap or staples ejection opening 7 which terminates at the upper surface thereof opposite anvil 5 and includes between its two edges a widened section 11 through which a staple can be ejected during the stapling operation. The stapling gap 7 takes the form of an elongate slot whose uninterrupted edge is formed at one longer side and two smaller sides by a metal plate 9 of the housing which is welded to the body of the stapling head that forms the edge of the slot on the second longer side. The length and width of the widened section 11 are adapted to the corresponding dimensions of the staple to be ejected.

Anvil 5 has two arcuate anvil surfaces 13 each adapted in a manner known in the art to cooperate with one of the legs of a staple and taking the form of an indentation in that surface of anvil 5 which faces stapling head 1. By means of screws 15 received with play in bores of anvil base 3 and of nuts 16, anvil 5 is connected to the lower surface of anvil base 3 such that the anvil surfaces 13 are aligned with respect to the stapling gap 7 of stapling head 1. Stapling head 1 is movable in a manner known in the art such that it can be moved between a retracted position (illustrated in FIG. 2) and an operative position in which its upper side including stapling gap 7 is moved close to the lower side of a sheet stack which rests with its upper side against anvil 5.

Figure 2:
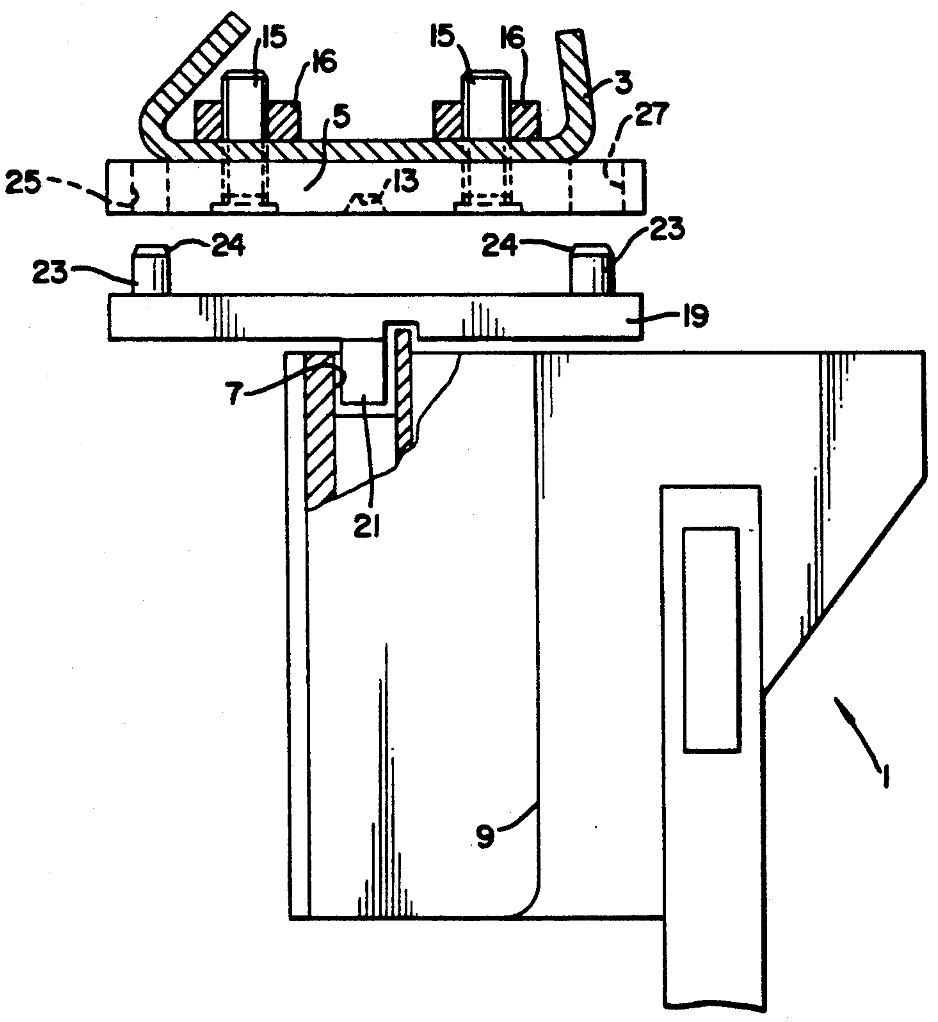
FIG. 2 shows a view, partially broken up and in section, of parts of FIG. 1, seen in the direction of the arrow II and with the adjustment piece attached to the stapling head.

In the retracted position in which the stapling head 1 is shown in the FIGS. an adjustment piece 19 can be attached to it, as is illustrated in FIG. 2.

Adjustment piece 19 is an extrusion-molded plastic plate having two broad surfaces or sides as shown, and whose contour resembles a star with four points. On one of its broad sides which faces the stapling head 1 when the adjustment piece 19 is attached to it, a fitting means in the form of a rib-type projection 21 forms an integral unit with adjustment piece 19. The length and the width of projection 21 are adapted to the internal length and width of the stapling gap 7 and its widened section 11 so that projection 21 can only be inserted into stapling gap 7 in a position determined by widened section 11, and when inserted, ensures that adjustment piece 19 is positively and precisely locked in its position opposite stapling head 1.

On the side of adjustment piece 19 opposite projection 21, two integrally molded round positioning pins 23 project vertically from the plane of the plastic plate of adjustment piece 19. Their free ends have sloping faces 24. The positioning pins 23 are located at the ends of the star points which extend at right angles to projection 21 so that the connecting line between the positioning pins 23 runs at right angles to the axis of the rectilinear projection 21.

The positioning pins 23, which serve as fitting means, are adapted for positively engaging complementary fitting means of the anvil 5, these means taking the form of positioning bores 25 and 27. As can be inferred from the Figs., positioning bore 25 is a round hole while positioning bore 27 is an oblong hole which extends in the direction of the connecting line with the other positioning bore 25.

An anvil 5 is connected with anvil base 3 in that the parts are pre-assembled such that anvil 5 is attached loosely and with play by means of the screws 15 and nuts 16 to the anvil base 3 in a position corresponding more or less to the predetermined position of the stapling head. Subsequently, the adjustment piece 19 is fixed on stapling head 1 in that projection 21 is inserted into stapling gap 7 while stapling head 1 is in its retracted position. Stapling head 1 is now moved to its operative position, i.e. in the direction towards anvil 5. The positioning pins 23 are received in the facing openings of the positioning bores 25 and 27 of anvil 5. Any deviations from the proper position of the positioning pins 23 and the positioning bores 25 and 27 are corrected during such movement by the opening edges contacting the sloping end faces 24 (FIG. 2) of the positioning pins 23, the anvil 5 being correspondingly aligned relative to anvil base 3 because the screws 15 and nuts 16 are not yet tightened and the screw holes in the anvil base 3 offer sufficient play for a suitable alignment. After the positioning pins 23 have been received in the positioning holes 25 and 27 and anvil 5 has thus been aligned, the screws 15 and nuts 16 can be tightened. Stapling head 1 is returned to its retracted position shown in FIG. 2 and adjustment piece 19 removed from stapling head 1.

This procedure is analogously applied to all anvils 5 of anvil base 3. If the anvils are of the type used in connection with a stapling head that can be adjusted to different sheet sizes or formats, the stapling head is set to the stapling position required and the anvil used is correspondingly aligned and mounted to anvil base 3.

If the adjustment piece 19 is an extrusion-molded and integrally formed plastic component the positioning bore 27 is advantageously an oblong hole because it allows a simple and inexpensive molding tool to be used, the distance, by which the positioning pin 23 associated with positioning bore 27 is spaced from the other positioning pin 23, not calling for a narrow manufacturing tolerance. The accurate alignment position of anvil 5 is not impaired by the oblong shape of positioning bore 27. Deviations in the transverse direction of the anvil base 3 are avoided by the engagement of one positioning pin in positioning bore 25. The danger of a longitudinal deviation in the direction of anvil base 3 does not exist because the oblong hole of the positioning bore 27 is not broader in that direction than the positioning pin 23 associated with it.

The above description and the drawings are confined to features essential to describing an embodiment of the invention. Inasmuch as features are disclosed in the description and drawings, therefore, and not mentioned in the claims, they also serve if necessary to define the subject matter of the invention.

The invention has been described in detail with particular reference to a presently preferred embodiment, but it will be understood that variations and modifications can be effected within the spirit and scope of the invention.

What is claimed is:

1. A stapling unit in combination with a mechanism for aligning, at a stapling position, an anvil of said stapling unit with a movable stapling head of said stapling unit, moved to said stapling position, comprising:

(a) a staples ejection opening in the stapling head for ejecting staples driven by the stapling head;

(b) first and second alignment bores spaced apart a first distance in said anvil;

(c) arcuate recess means formed in the anvil between said first and second bores for receiving and bending legs of a driven staple; and (d) said mechanism comprising a plate member having first and second sides, said plate member including:

(i) first and second pins spaced apart substantially said first distance on said first side of said plate member for insertion into said first and second alignment bores in said anvil; and (ii) a rib-shaped projection formed on said second side of said plate member for insertion into said staples ejection opening in said stapling head.

2. The mechanism of claim 1 wherein said arcuate recess mans in said anvil is formed so as to be aligned with said rib-shaped projection in said plate member when said first and second pins of said plate member are inserted in said first and second alignment bores in said anvil.

3. The mechanism of claim 1 wherein said first alignment bore in said anvil is round and said second alignment bore is oblong.

4. The mechanism of claim 1 wherein said rib-shaped projection extends across said second side of said plate member along a line substantially transverse to a line connecting said first and second pins of said plate member.

5. The mechanism of claim 1 wherein said first and second pins on said plate member each have a free end remote from said plate member and have slanted surfaces at said free end.

6. A method for fixedly mounting an anvil of a stapling unit, having a staple legs bending recess, at a stapling position with a movable stapling head of the stapling unit having an operative position at said stapling position and a non-operative position remote from said stapling position, the method comprising the steps of:

(a) moving the stapling head to the non-operative position;

(b) providing an anvil with a first alignment bore in said anvil to a first side of said staple legs bending recess and a second alignment bore to a second and substantially opposite side of said recess;

(c) providing a plate member having first and second pins on a first surface thereof adapted for inserting respectively into said first and second alignment bores in said anvil, and having a rib-shaped projection on the second surface thereof;

(d) loosely mounting said anvil to a base member at said stapling position;

(e) attaching said plate member to the stapling head by inserting said rib-shaped projection of said plate member into an opening in the stapling head for ejecting staples;

(f) moving the stapling head to the operative position;

(g) adjustably moving said loosely mounted anvil into an aligned position for inserting said first and second pins of said plate member into said first and second alignment bores in said anvil; and (h) fixedly mounting said anvil in said aligned position.

* * * * *